3,254,040
THIXOTROPIC SYRUPS CONTAINING POLY-
AMIDE-MODIFIED UNSATURATED POLY-
ESTERS AND STYRENE
Elihu J. Aronoff, Queens, N.Y., Arthur Weber, Loveland, Ohio, and Thomas A. Augurt, Jackson Heights, and Joseph A. Ciuffo, Brooklyn, N.Y., assignors to Interchemical Corporation, New York, N.Y., a corporation of Ohio
No Drawing. Filed Dec. 7, 1962, Ser. No. 242,887
6 Claims. (Cl. 260—22)

This invention relates to a process for the preparation of stable thixotropic unsaturated polyesterstyrene syrups and to the products themselves.

The desirability of thixotropic properties in many paints and other coating compositions is now generally recognized. Some of the additives used for imparting thixotropy to vehicles are soaps, limed oils and varnishes, bodied oils, and special pigments or fillers. Another additive is disclosed in U.S. Patent No. 2,663,649, which teaches the preparation of thixotropic vehicles based on oil-modified alkyds, ester oils, and varnish ester bodies by the addition of a polyamide resin of the type described in the patent. Polyesters unmodified by oil, however, do not yield thixotropic compositions with polyamides when prepared by the processes known to the prior art. Oil-modified alkyds are undesirable in some applications because of odor and hardness, and in general, drying oil-modified alkyds have disadvantages similar to those of drying oils, e.g., they cannot be used in bulk applications where oxidizing curing conditions are not present.

It has now been found that unsaturated polyester-styrene monomer syrups suitable for use in laminates and castings may be given excellent thixotropic properties in the presence of small amounts of combined relatively neutral polyamides soluble in common organic solvents and of relatively high softening points. The polyamides must be cooked into the polyester, otherwise incompatibility results. The monomer syrup mixture is prepared by rapid addition of styrene to the polyester or rapid addition of the polyester to the styrene, the styrene being at about room temperature and the polyester being at a temperature in the range of about 120–165° C. The mixing is done as rapidly as practicable, the temperature of the final mixture being around 60° to 95° C. but preferably 80–95° C. Minor amounts of additives, such as inhibitors, modifiers, etc., may also be incorporated in the syrups.

The polyesters of interest are based on alkylene glycols, phthalic anhydride, maleic anhydride, and fumaric acid. It was found that such polyesters, when combined with styrene to form conventional polyester-styrene syrups could not be made satisfactorily thixotropic by the addition of commercial thixotropic agents such as aluminum soaps, processed clay, polymerized oil, polymerized organic esters, polyamides used in conventional ways, epoxides, polyhydroxy-stearic acid, polyhydric stearates, hydroxylated amide waxes, pentaerythritol tetraricinoleate, magnesium aluminum silicate, polyoxyethylene, oleates of sorbitol, fatty amine silicates, and numerous other commercial thixotropic agents of undisclosed composition. A certain commercial wax derived from castor oil as well as a bentonite clay derivative did produce thixotropy, but these systems showed undesirable viscosity drift. In some the additive separated.

The thixotropic polyesters of this invention are stable for at least six months, with no significant viscosity drift, e.g., their thixotropic properties are retained far longer than analogous compositions whose thixotropic properties are imparted by adjuvants. The properties of laminates made from the polyester syrups of this invention are at least as good as those of prior art laminates made from compositions whose thixotropy is due to adjuvants only.

The new process entails the cooking of polyamide with an unsaturated polyester having an acid number below 45. The cook is continued for periods varying from 5 minutes to 5 hours or more. Relatively short cooks, such as 20 minutes to 1 hour, are best for optimum thixotropy, longer cooks resulting in less thixotropic syrups. While the polyester is still at a temperature of 120° to 165° C., the mixing with styrene is carried out as rapidly as practicable, allowing the temperature to drop down to about 80–95° C. during the addition. It will not do to add all the styrene at the temperature of the polyester and then cool the batch either rapidly or slowly; significantly lower thixotropic results with these treatments. When the mixing of polyester with styrene is carried out at room temperature, no thixotropy results. If the cold cut syrup is then heated up a low degree of thixotropy is obtained.

The proportions used are preferably from about 30% to about 60% by weight of styrene to, correspondingly, from about 70% to about 40% by weight of polyester-polyamide polymer. The latter is preferably made by heating at least 1% by weight of a polyamide with the polyester when the acid number of the latter is less than about 45. With 0.5% of polyamide the thixotropic effect is perceptible.

The polyamide preferred is a relatively neutral, crystalline, thermoplastic linear polymer of high molecular weight consisting essentially of the reaction product of ethylene diamine, an aliphatic saturated dibasic acid, and a dimer acid, the polyamide having a softening point in the range 180° to 190° C.

Polyamides that were inoperative were for instance "Omamid" types, "Versamid 930" and "Versamid 940" types, sulfone-containing polyamides, amine-terminated polyamides, and others.

PREPARATION OF THE POLYESTERS

All the components were heated together under nitrogen to a temperature of 95° C. Additives may be incorporated at this point if desired. The temperature was increased to 175° C. and held there for 1 hour, after which it was raised to 200° C. and maintained at that point until the acid number reached the desired value.

*Polyester A*

The components were

| | G. |
|---|---|
| Propylene glycol | 1680 |
| Phthalic anhydride | 1860 |
| Hydroquinone | 0.7 |
| Maleic anhydride | 740 |

The acid number was 35 to 40.

Polyester B

The components were

| | G. |
|---|---|
| Diethylene glycol | 474 |
| Hydroquinone | 6.6 |
| Propylene glycol | 1097 |
| Phthalic anhydride | 1552 |
| Fumaric acid | 810 |

The acid number was 33.

Polyester C

The components were

| | G. |
|---|---|
| Ethylene glycol | 213 |
| Propylene glycol | 798 |
| Polyoxyethylene glycol (Carbowax 600) | 163 |
| Hydroquinone | 0.5 |
| Phthalic anhydride | 1155 |
| Fumaric acid | 600 |

The acid number was 26.2.

Polyester D

The components were

| | G. |
|---|---|
| Diethylene glycol | 448 |
| Propylene glycol | 117 |
| Hydroquinone | 0.12 |
| Fumaric acid | 216 |

The acid number was 34.

Polyester E

The components were

| | G. |
|---|---|
| Diethylene glycol | 390 |
| Propylene glycol | 891 |
| Polyoxyethylene glycol (Carbowax 600) | 497 |
| Hydroquinone | 0.6 |
| Phthalic anhydride | 1355 |
| Fumaric acid | 705 |

The acid number was 41.6.

Polyester F

The components were

| | G. |
|---|---|
| Diethylene glycol | 408 |
| Hydroquinone | trace |
| Propylene glycol | 938 |
| Phthalic anhydride | 1355 |
| Fumaric acid | 705 |

PREPARATION OF THE POLYAMIDES

The acids were heated under nitrogen to 140° C. and then ethylene diamine was added. The temperature was raised to 200° C. and held there until the desired acid number was attained.

Polyamide A

The components were

| | G. |
|---|---|
| "Emery 3079" | 1000 |
| Sebacic acid | 100 |
| Ethylene diamine | 130 |

The acid number was 10.8. The softening point was in the range 180°–190° C.

Polyamide B

The components were

| | Parts by wt. |
|---|---|
| "Empol 1022" | 71.5 |
| Ethylene diamine | 8.6 |

The acid value was 3, the amine value 17.0, and the softening point 97–99° C. (Durran's mercury method.) The relative amounts of amine and acids thus may vary sufficiently from stoichiometric proportions to yield a polyamide having a combined acid and amine number of not over 20 and the dibasic acid or acids should have a chain of at least about 8 methylene groups.

PREPARATION OF THE POLYESTER-POLYAMIDE POLYMERS

The polyester was heated to about 180° C. under nitrogen and then the polyamide added while stirring. Heating at about 195° C. was continued up to about one hour and the material was then cooled.

Example 1

2440 g. of polyester A were heated to 185° C. and then 37 g. of polyamide A added. After having been stirred 1 hour at 195° C. the material was cast and cooled. 1800 g. of the product were heated to 120° C. ½% by weight of hydroquinone added and then 1200 g. of styrene were added quickly. The mixture cooled down at once to 85° C. Stirring was continued until the temperature deceased to 75° C. and then the batch was cast and cooled on ice. The material was thixotropic.

Example 2

The procedure of Example 1 was repeated using toluene instead of styrene. The product was equally thixotropic.

Example 3

950 g. of polyester B and 50 g. of polyamide A were treated by the procedure of Example 1. The resulting polyester-styrene syrup was thixotropic.

Example 4

950 g. of polyester C and 50 g. of polyamide A were treated by the procedure of Example 1. The syrup was thixotropic.

A similar series of experiments wherein the hot polyester was added to styrene was conducted and the products had thixotropic properties as in Examples 1–4.

No completely satisfactory theory of thixotropy has yet been proposed. In many systems the particles have markedly different dimensions in different directions. The particles are in these cases elongated ellipsoids, flat plates, disks, or the like. To form a gel the particles probably have to arrange themselves in a more or less orderly manner. On the other hand the latter situation may just hold for the phenomenon of rheopexy. In any case, the process of this invention was unpredictable on the basis of the known art.

"Empol 1022" is essentially a $C_{36}$ dibasic acid resulting from the polymerization or dimerization of naturally occurring $C_{18}$ unsaturated fatty acids. Its dimer content is 71%, trimer content 26%, and monomer content 3%.

"Emery 3079" has a molecular weight of 588 and is a polymeric fatty acid with a dimer content of 95%. Its Gardner-Holdt viscosity is Z–4 at 25° C. The art considers "dimer" acids to be low molecular weight dibasic acids containing 36 carbon atoms. Such acids are made by the heat polymerization of linoleic acid.

Example 5

4.5 parts by weight of Versamid 900 were added to 86.5 parts by weight of polyester F at 180–220° C. and cooked for one hour. The batch was allowed to cool to 125–128° C., 0.01% by weight of hydroquinone added, followed immediately by 33.1 parts of styrene at about room temperature. Stirring was continued until the material reached room temperature.

Further examples were based on Example 5, the variations being in the composition of polyester F, where the glycol part was varied but the same molar ratio to acids was retained. For instance some of the propylene glycol was replaced by diethylene glycol and some of either of these two glycols was replaced by polyoxyethylene glycol ("Carbowax").

It was found that ether glycols in the polyester formulations markedly increased the degree of thixotropy obtained, this being particularly true where there was a localized concentration in small segments of the molecule of the ether groups in polyoxyethylene glycols as compared with the effect of isolated ether groups in diethylene glycol. The latter produced the thixotropic effects more effectively than did polyesters having a dearth of ether groups.

This phenomenon is illustrated in the following table.

| Ether groups (—O—) per 100 moles | Ether groups (concentrated) per 100 moles | Increase in degree of thixotropy over syrups having no ether groups |
|---|---|---|
| 23.4 | 0 | Slight. |
| 24.4 | 24.4 | Moderate. |
| 73.5 | 0 | Less moderate. |
| 83.5 | 61 | Very great. |

Thioxotropic behavior of the syrups was ascertained both by inspection and by a procedure like that given in "Industrial Rheology and Rheological Structure" by Henry Green, New York, 1946.

The syrup in Example 1, for instance, was allowed to stand 24 hours, then shaken, and a series of consecutive viscosity measurements made with Brookfield spindle #3 at 25° C. with various r.p.m. rates. The results, showing thixotropy, are given below.

Revolutions/minute:        Centipoises
2 ----------------------------------- 4500
4 ----------------------------------- 3100
10 ---------------------------------- 1880
20 ---------------------------------- 1360
10 ---------------------------------- 1640
4 ----------------------------------- 2400
2 ----------------------------------- 3500

The time required for mixing styrene and the polyester-polyamide to produce the temperature drop described was found to vary from 10 seconds up to about 15 minutes, depending on the size of batch, proportion of hot components to cool component, and method of cooling container.

What is claimed is
1. The process of making a thixotropic unsaturated polyester-styrene syrup consisting of

(a) rapid mixing of from about 30% to about 60% by weight of styrene at about room temperature with
(b) from about 70% to about 40% by weight of unsaturated polyester-polyamide polymer at a temperature of about 120°–165° C.,
(c) the temperature of the mixture immediately after all the components are mixed being 80° to 95° C.,
(d) the unsaturated polyester being a polyester comprising the reaction product of at least one alkylene glycol with a member selected from the group consisting of maleic anhydride and fumaric acid,
(e) the polyester having been reacted with about 1–5% by weight of a polyamide when the acid number of the polyester was below about 45 by heating at about 195° C. for about 5 minutes to about 5 hours, and
(f) the polyamide being a crystalline, thermoplastic linear polymer of relatively high molecular weight consisting essentially of the reaction product of ethylene diamine, an aliphatic saturated dibasic acid having a chain of at least about 8 methylene groups, and a dimer acid, the polyamide having a softening point in the range of about 180–190° C., the relative amounts of amine and acids varying sufficiently from stoichiometric proportions to yield a polyamide having a combined acid and amine number of not over 20.

2. The process of claim 1 in which at least one of the alkylene glycols in (d) contains ether groups.

3. The process of claim 2 in which at least a minor amount of the ether groups are concentrated in comparatively small segments of the molecule.

4. A thixotropic unsaturated polyester-styrene syrup prepared by the process of claim 1.

5. A thixotropic unsaturated polyester-styrene syrup prepared by the process of claim 2.

6. A thixotropic unsaturated polyester-styrene syrup prepared by the process of claim 3.

References Cited by the Examiner

UNITED STATES PATENTS 2,889,292   6/1959   Peerman _____ 260—857
3,001,961   9/1961   Armitage et al. _____ 260—22
3,124,550   3/1964   Salgado et al. _____ 260—22

LEON J. BERCOVITZ, *Primary Examiner.*

R. A. WHITE, *Assistant Examiner.*